United States Patent [19]

Khutoretsky et al.

[11] Patent Number: 4,864,171
[45] Date of Patent: Sep. 5, 1989

[54] ROTOR OF AN ELECTRIC MACHINE

[75] Inventors: Garri M. Khutoretsky; Jury G. Tjurin; Viktor S. Yakovlev, all of Leningrad, U.S.S.R.

[73] Assignee: Leningradskoe Proizvodstvennoe Electromashinostroitelnoe Objedinenie "Electrosila", Leningrad, U.S.S.R.

[21] Appl. No.: 240,724

[22] Filed: Sep. 6, 1988

[51] Int. Cl.$^4$ .............................................. H02K 9/00
[52] U.S. Cl. ...................................... 310/52; 310/270; 310/214; 310/198; 29/598
[58] Field of Search ...................... 310/43, 45, 52, 198, 310/214, 215, 270, 61, 10, 203, 206; 29/598

[56] References Cited

U.S. PATENT DOCUMENTS

| | | | |
|---|---|---|---|
| 3,952,406 | 4/1976 | Madsen | 310/43 |
| 3,991,333 | 11/1976 | Laskaris | 310/52 |
| 4,037,312 | 7/1977 | Deis | 310/43 |
| 4,385,248 | 5/1983 | Laskaris | 310/43 |
| 4,442,369 | 4/1984 | Okamoto | 310/45 |
| 4,658,170 | 4/1987 | Ueda | 310/52 |

Primary Examiner—Patrick R. Salce
Assistant Examiner—C. LaBalle
Attorney, Agent, or Firm—Lilling & Greenspan

[57] ABSTRACT

The end turn portions of the saddle-shaped coils of a superconducting field winding in the rotor of an electric machine are clamped in an axial direction by a wedge device positioned in an annular recess between its wall and the nearest end turn portion. The wedge device comprises two rings mounted coaxially with the recess and having their sides facing each other bevelled so that the distance therebetween increases toward the axis of the rings. These sides are provided with radial depressions. Bolts with heads tapering toward the threaded portions are positioned in the depressions. When the bolts are radially shifted the rings are forced apart thus pressing the end turn portions one to another and to the wall of the recess.

1 Claim, 1 Drawing Sheet

ROTOR OF AN ELECTRIC MACHINE

FIELD OF THE INVENTION

The invention relates to electric machines, and more particularly to rotors of electric machines with superconducting field windings, such as cryogenic turbogenerators.

DESCRIPTION OF THE PRIOR ART

The operation of electric machines with superconducting windings is based on superconductivity caused by cooling the windings to a temperature of 4-5 K, as a result of which the electrical resistance of the windings becomes vanishingly small. To reach the required temperature, the windings are usually cooled by liquid helium which passes through channels provided for this purpose. Superconductivity quenches even at a slight increase in the temperature of the windings, even a local increase in this temperature leading to a sharp increase in the electrical resistance of the windings. Such a local increase in temperature may be caused by displacement of the winding portions during rotation of the rotor. This displacement leads to heating of the windings caused by friction and by the flow of electric current induced in the windings as they move in the magnetic field of the stator.

Known is a rotor of an electric machine (US, A, 3,991,333) wherein the superconducting field windings are implemented as flat coils having straight portions and end turn portions. The coils are so arranged that their planes are parallel, while their transversal dimensions decrease as the distance from the longitudinal axis of the rotor increases. The coils are secured between supporting plates tied by bolts passing transversely to the coil planes. A retaining ring is put over the supporting plates so as to produce an interference fit.

Such a design does not ensure good conditions for cooling of the end turn portions of the coils because during rotation of the rotor the coolant is driven from the central part of the rotor to its circumference under the action of centrifugal forces. Besides, the stiffness of such a rotor design is inadequate, with the result that the windings are subjected to bending stresses during rotation. Both these factors have particularly adverse effect in the rotors of great diameters, which makes impossible employment of such a design in high-power electric machines.

To improve cooling of the end turn portions saddle-shaped coils are used.

Known to the prior art is a rotor of an electric machine (U.S., A, 4,385,248), comprising a supporting structure, a superconducting field winding including saddle-shaped coils arranged one within another, each coil having straight portions passing along the axis of the rotor and end turn portions laid transverse to the rotor axis. The end turn portions are positioned in annular recesses at the ends of the supporting structure of the rotor. In each annular recess the end turn portions of the coils are pressed to one wall of the annular recess and to one another by wedge devices located between these end turn portions and the other wall of the recess. To press the end turn portion along their entire lengths, it is necessary to have several wedge devices disposed in each annular recess circumferentially along the wall of the annular recess. Each wedge device includes two wedges positioned radially against each other so that the base of one of them (of the inner wedge) rests against the bottom of the recess, while the base of the other one (of the outer wedge) rests against the retaining ring embracing the rotor.

During operation the parts of the rotor can undergo deformations giving rise to gaps in an axial direction, specifically between the end turn portions of the coils and between these portions and the walls of the annular recess. When such gaps occur, they are taken up as a result of radial displacement of the inner wedges under centrifugal forces. However, to make this process effective, the wedges must be sufficiently heavy and therefore preferably made of metal. Because of different thickness of end turn portions in different places, to provide their uniform tightening the wedges of different wedge devices have to be driven to different depths. Therefore, when assembling the rotor, each pair of wedges should be fitted individually by suitable selection of the wedges or worked to suit the inner diameter of the retaining ring. Working of metal wedges directly on the rotor leads to formation of metal dust which, falling on the coils, can cause shorting of the coil turns. All this complicates the assembly of the rotor.

Besides, with end turn portions fixed in such a way, the rotor balance may be disturbed as a result of displacement of the wedges in tangential directions during rotation of the rotor.

SUMMARY OF THE INVENTION

It is an object of the present invention to provide a rotor of an electric machine having a superconducting field winding and wedge devices which make possible obtaining the required forces pressing the end portions of the winding coils in an axial direction without special selection or working of the elements of the wedge devices.

Another object of the present invention is to prevent displacement of the wedge devices in tangential directions during rotation of the rotor.

Still another object of the present invention is to prevent disturbance of the rotor balance during rotation thereof.

Still another object of the present invention is to simplify the assembly of the rotor.

With these and other objects in view, there is proposed a rotor of an electric machine with a superconducting field winding, comprising a supporting structure, a superconducting field winding including several saddle-shaped coils arranged one within another, each of the coils having straight portions passing along the rotor axis and end turn portions laid transverse to the rotor axis in two annular recesses respectively formed at the ends of the supporting structure, and wedge devices. The wedge devices are respectively positioned in said annular recesses between one wall of the recess and the turn portions of the coils laid therein for pressing them one to another and to the other wall of the recess. According to the invention, each of the wedge devices comprises two rings mounted side by side in the respective recess coaxially therewith. The ring sides facing each other are bevelled so that the distance therebetween increases toward their axis (toward the inner cylindrical surfaces of the rings). Each ring is provided with a plurality of radial depressions respectively positioned opposite the radial depressions on the side of the other ring. The wedge device further comprises bolts having heads tapering toward threaded portions of the bolts and respectively entering the pairs of the opposite depressions on the ring sides so that the ends of the threaded portions protrude beyond the outer edges of the rings (the outer cylindrical surfaces of the rings) and the tapering sides of the heads abut on the ring sides facing each other. The wedge device also comprises nuts mounted on the protruding ends of the threaded portions of the bolts.

With such a rotor, since the rings have bevelled sides and the bolts have tapering heads, tightening of the nuts forces the rings apart whereby the end turn portions of the coils are pressed against one another and the wall of the annular recess. In such a case the required pressing force is provided without any special selection or additional working of the wedge devices, which simplifies the assembly of the rotor. Because the bolts are positioned in the radial depressions of the rings, tangential displacement of the bolts and thus disturbance of the rotor balance are avoided.

The aforementioned and other objects and advantages of the present invention will become more apparent upon consideration of the following detailed description of its preferred embodiments taken in conjunction with the accompanying drawings.

DETAILED DESCRIPTION OF THE INVENTION

Figure 1:
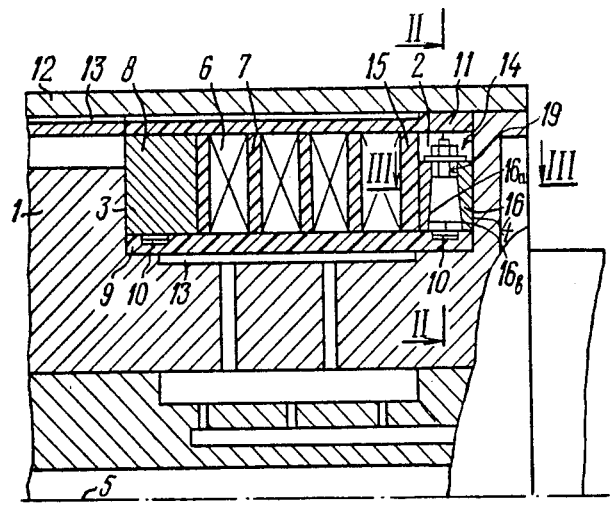
FIG. 1 is a longitudinal cross-sectional view of a part of the rotor of an electric machine with a superconducting field winding, constructed according to the present invention.

Referring to FIG. 1, the rotor of an electric machine comprises a supporting structure 1 having at its end an annular recess 2 with side walls 3 and 4. The supporting structure 1 has the same annular recess (not shown) at its other end. The rotor has a superconducting field winding including several saddle-shaped coils arranged one within another. Each of the coils has straight portions (not shown) passing along the axis 5 of the rotor, an end turn portion 6 laid in the annular recess 2, and an end turn portion (not shown) laid in the same way as the end portion 6 in the annular recess at the other end of the rotor.

Spacers 7 made of insulating material are positioned between the end turn portions 6. A spacer 8 is positioned between the wall 3 of the annular recess 2 and the end turn portion 6 nearest it. Segments 9 made of insulating material (FIG. 2) are laid between the bottom of the annular recess 2 and the lower turns of the end turn portions 6 and secured to the supporting structure 1 (FIG. 1) with retaining tapes 10. Segments 11 (see also FIG. 2) also made of insulating material are mounted between the walls 3 and 4 of the annular recess 2 over the end turn portions 6. A retaining ring 12 is put over the rotor so as to provide an interference fit. The supporting structure 1 and the segments 9 and 11 have channels 13 for the passage of a coolant. A wedge device 14 is mounted between the wall 4 of the annular recess 2 and the end turn portion 6 nearest it. A ring 15 made of insulating material and consisting of two semirings is positioned between this end turn portion 6 and the wedge device 14. The spacers 7 and 8 and the ring 15 also have channels (not shown) for passing the coolant therethrough.

The wedge device 14 comprises two rings 16 mounted side by side in the annular recess 2 coaxially therewith. The rings 16 have an inner diameter equal to the diameter of the cylindrical surface formed by the outer surfaces of the segments 9 and an outer diameter equal to the diameter of the cylindrical surface formed by the inner surfaces of the segments 11. The rings 16 have radial cut-outs 17 disposed around the circumferences of the rings and spaced by some distance one from another. The rings 16 are mounted so that the cut-outs 17 of one of them are respectively positioned opposite the cut-outs 17 of the other ring. The rings 16 have sides 16a and 16b facing each other and bevelled so that the distance therebetween increases toward the axis of the rings 16 (coinciding with the axis 5 of the rotor), i.e. toward the inner cylindrical surfaces of the rings 16. The sides 16a and 16b are provided with radial depressions 18 (FIG. 3) respectively departing from the cut-outs 17 so that the radial depressions on the side 16a of one ring 16 are respectively positioned opposite the radial depressions on the side 16b of the other ring 16.

The wedge device 14 further comprises bolts 19 (FIG. 1). Each of the bolts 19 has a head 19a and a threaded portion 19b, the shape of the head 19a being such that it tapers toward the threaded portion 19b. The bolts 19 are mounted so that their heads 19 respectively enter the pairs of the depressions 18 located opposite one another on the sides 16a and 16b of the rings 16 (FIG. 3) so that the tapering sides of the heads 19a abut on the sides 16a and 16b, while the threaded portions 19b of the bolts 19 (FIGS. 1 and 2) protrude beyond the outer edges (outer cylindrical surfaces) of the rings 16 at the places of location of the cut-outs 17.

The wedge device 14 further comprises nuts 20. The nuts 20 are respectively mounted in the cut-outs 17 of the rings 16 on the protruding ends of the threaded portions 19b of the bolts 19. Washers 21 are mounted between the nuts 20 and the outer edges of the rings 16.

With the rings 16 made as described above, each ring 16 may consist of two semirings which are placed in the annular recess 2 before mounting of the segments 11 and the retaining ring 12. However, the rings 16 may be also made solid. In such a case they are cut out from the walls 3 and 4 of the annular recess 2. If solid rings 16 are used, their outer diameter can be smaller than the inner diameter of the cylindrical surface formed by the inner surfaces of the segments 11 by a value which is sufficient for accommodation the threaded portions 19b and the nuts 20. In such a case the cut-outs 17 at the circumference of the ring 16 are not needed.

Figure 2:
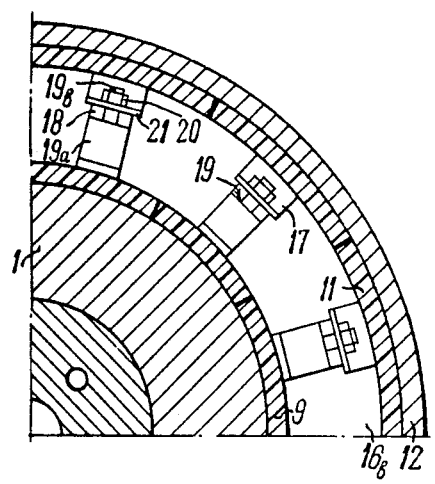
FIG. 2 is a radial cross-sectional view of the part of the rotor taken along the line II—II of FIG. 1.
Figure 3:
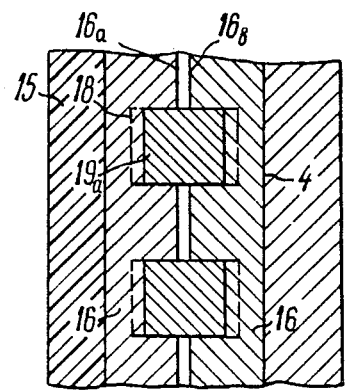
FIG. 3 is an enlarged cross-sectional view taken along the line III—III of FIG. 1.

As can be seen from FIGS. 1–3, the head 19a of the bolt 19 has the shape of a truncated pyramid, two opposite sides of the pyramid (the sides abutting on the sides 16a and 16b of the rings 16) being inclined in opposite directions to the axis of the bolt 19 (FIG. 1), while the other two opposite sides are parallel to said axis (FIG. 2). In this case the lateral edges of the depression 18 are made parallel to the ring radius passing midway between said edges. It is also possible, however, to use bolts 19 with heads having the shape of a truncated cone. In such a case the lateral edges of the depression 18 are preferably made diverging as they pass in the direction from the axis of the ring to its circumference.

In the assembly of the rotor made according to the invention, the insulating segments 9 (see also FIG. 2) are placed on the bottom of the annular recess 2 (FIG.

1) between the walls 3 and 4 and secured by the retaining tapes 10. The field winding coils are laid on the supporting structure 1 of the rotor, the end turn portions 6 of the coils being placed in the annular recess 2 over segments 9. Then the spacers 7 and 8 are mounted. When using solid rings 16 made by cutting them out from the walls 3 and 4, these rings should be positioned between the wall 4 and the end turn portion 6 nearest it. When using rings 16 consisting each of two semirings they are mounted in the same place, each pair of the semirings being held together by a retaining tape passing around the ring 16.

The bolts 19 are mounted prior to mounting of the insulating rings 15, which permits the rings 16 to be moved apart and the bolts 19 to be easily set between the rings 16 into the respective pairs of the depressions 18. Thereupon the semirings of the rings 15 are mounted.

Then the washers 21 and the nuts 20 are placed on the threaded portions 19b of the bolts 19. As the nuts 20 are tightened, the bolts 19 move in radial directions toward the outer edges of the rings 16. Since the sides 16a and 16b of the rings 16 are bevelled as described above and the sides of the bolt heads 19a abutting on the sides 16a and 16b are tapered toward the threaded portions 19b, the heads 19a of the bolts 19 in combination with the rings 16 form wedge pairs. Therefore, as the bolts 19 move in radial directions, the rings 16 of the wedge device are forced apart pressing the end turn portions 6 of the field winding coils to one another and to the wall 3 of the annular recess 2. As shown in FIG. 2, several bolts 19 are placed along the entire length of the end turn portion 6 nearest the wall 4 of the recess 2. The tightening of the nuts 20 is carried out in several stages to provide tangentially uniform pressing of the end turn portions.

When using rings 16 made of semirings, the retaining tapes wrapped around the semirings are removed before mounting the segments 1.

Thus the required force pressing the end turn portions 6 in an axial direction is provided without selection or working of the elements of the wedge device 14, whereby the assembly of the rotor is simplified.

If the rings 16 are made of semirings, as described above, the outer cylindrical surfaces of the rings 16 between the cut-outs 17 bear up against the segments 11 preventing thereby movement of the semi-rings in radial directions.

During operation of the electric machine, e.g. in the process of cooling of the rotor down to the temperature of the coolant, the elements of the rotor may undergo deformations. In such a case the appearance of gaps in an axial direction between the end turn portions 6 of the field winding coils and between these portions and the wall 3 of the annular resess 2 (because of different thermal expansion coefficients of the rotor materials) is prevented as a result of radial displacement of the bolts 19 by the action of centrifugal forces so that the rings 16 are forced apart clamping the end turn portions 6 and thereby reliably fixing them during operation of the rotor. For this purpose the bolts 19 are preferably made of some heavy material, i.e. metal, such as copper or brass.

As pointed out above, the heads 19a of the bolts 19 (FIG. 2) are located in the radial depressions 18 of the rings 16. As a results, the elements of the wedge device 14 are prevented from being shifted in tangential directions during assembly or ratation of the rotor. By this means disturbance of the rotor balance is avoided.

When the invention is described herein in the terms of the preferred embodiments, various modifications may be made without departure from the spirit and scope of the invention as defined in the appended claim.

What is claimed is:

1. A rotor of an electric machine with a superconducting field winding, comprising:

a supporting structure having two ends and provided with two annular recesses having walls and respectively positioned at said ends of said supporting structure;

a superconducting field winding including several saddle-shaped coils arranged one within another, each of said coils having straight portions passing along the axis of said rotor and end turn portions laid transverse to the axis of said rotor in said annular recesses; and two wedge devices respectively positioned in said annular recesses so that each wedge device is located between one of said walls of the respective annular recess and said end turn portions of said coils laid therein for pressing said end turn portions against one another and against the other of said walls of this recess in an axial direction, each of said wedge devices comprising:

two rings having each two sides, an outer cylindrical surface and an inner cylindrical surface and positioned side by side in the respective annular recess coaxially therewith, the ring sides facing each other being bevelled so that the distance therebetween increases toward said inner cylindrical surfaces of said rings and being provided each with a plurality of radial depressions respectively positioned opposite the radial depressions on the side of the other ring;

bolts each having a threaded portion and a head having sides tapering toward said threaded portion, said heads respectively entering the pairs of said opposite depressions on the sides of the rings so that the ends of said threaded portions protrude beyond said outer cylindrical surfaces of said rings and said tapering sides of said heads abut on said ring sides facing each other; and nuts respectively mounted on said protruding ends of said threaded portions of said bolts.

* * * * *